(12) United States Patent
Stockburger

(10) Patent No.: US 9,215,774 B2
(45) Date of Patent: Dec. 15, 2015

(54) METHOD FOR OPERATING A LAMP

(71) Applicant: HERBERT WALDMANN GMBH & CO. KG, Villingen-Schwenningen (DE)

(72) Inventor: Marc Stockburger, Villingen-Schwenningen (DE)

(73) Assignee: Herbert Waldmann GmbH & Co. KG, Villingen-Schwenningen ( * ) Notice: Subject to any disclaimer, the term of this patent is extended or adjusted under 35 U.S.C. 154(b) by 0 days.

(21) Appl. No.: 14/203,789

(22) Filed: Mar. 11, 2014

(65) Prior Publication Data

US 2014/0339989 A1    Nov. 20, 2014

(30) Foreign Application Priority Data

May 14, 2013    (EP) ..................................... 13167676

(51) Int. Cl.
*H05B 37/02*    (2006.01)
*H05B 33/08*    (2006.01)

(52) U.S. Cl.
CPC ........ *H05B 33/0854* (2013.01); *H05B 33/0869* (2013.01); *H05B 37/02* (2013.01); *H05B 37/0218* (2013.01); *Y02B 20/46* (2013.01)

(58) Field of Classification Search
CPC ....................................................... H05B 37/02
USPC .................. 315/149–159, 291, 307, 308, 312
See application file for complete search history.

(56) References Cited

U.S. PATENT DOCUMENTS

| 8,324,817 | B2 * | 12/2012 | Ivey | ........................... | F21K 9/17 |
| | | | | | 315/149 |
| 2008/0203928 | A1 * | 8/2008 | Frumau | ................ | H05B 37/029 |
| | | | | | 315/151 |
| 2011/0115386 | A1 * | 5/2011 | Delnoij | ..................... | G01J 1/16 |
| | | | | | 315/152 |
| 2011/0291564 | A1 | 12/2011 | Huang | | |
| 2012/0206050 | A1 * | 8/2012 | Spero | ............................ | 315/152 |
| 2014/0015417 | A1 * | 1/2014 | Iwai et al. | ...................... | 315/151 |

FOREIGN PATENT DOCUMENTS

| DE | 10 2010 031428 A1 | 1/2012 |
| WO | WO 2012/063149 A2 | 5/2012 |
| WO | WO 2013/067389 A1 | 5/2013 |

* cited by examiner

*Primary Examiner* — Tung X Le
(74) *Attorney, Agent, or Firm* — Juneau & Mitchell

(57) ABSTRACT

The invention relates to a method for operating a lamp comprising a first light for direct lighting and a second light for indirect lighting of an object, as well as a controller controlling the first and second light emitting means separately, and at least one light sensor is mounted on the lamp and connected to the controller for detecting the amount of light in the area, including any extraneous light. The controller has means to subtract the indirect amount of light reaching the light sensor from the total amount of light coming from the second light emitting means as detected by the light sensor, and the amount of direct light produced by the first light emitting means reaching the light sensor, as well as any existing extraneous light reaching the light sensor, in order to control the lamp, in particular by switching it on or off.

16 Claims, 6 Drawing Sheets

METHOD FOR OPERATING A LAMP

CROSS REFERENCE TO RELATED APPLICATIONS

This patent application claims priority to European Patent application 13 167 676.9, filed May 14, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The invention relates to a method for operating a lamp having a first light emitting means for direct light and a second light emitting means for the indirect illumination of an object. The lamp has a controller to separately control the first light emitting means and the second light emitting means, as well as a light sensor for detecting the total amount of light in the range of the light sensor including any existing extraneous light there. The light sensor connected to the controller.

2. Background of the Invention

The current state of knowledge is as follows.

Such a method is disclosed, for example in DE 10 2009 016 753 A1. In that case, one or more free-standing lamps are provided for room lighting, and are formed either individually or in their entirety to emit a first indirect light component, a second large-area direct light component illuminating a designated object, as well as a third light component that is essentially directly bundled. In this case, the first light component is controlled centrally, while the third light component may be switched on and off by a user. It is so arranged that the light component output of the lamps that is used for room related lighting is controlled centrally, while, on the other hand, the light component used for specific local lighting is adjustable by a user.

Another method for operating a lamp is known from DE 10 2010 031 428 A1. The lamp has a first light source to produce general lighting and a control unit by means of which the first light source emits light at various intensities with respect to a set brightness level. The light has a sensor for detecting a brightness level. The control unit controls the first light source as a function of the brightness level value detected by the light sensor. In addition, the lamp has a second light source to produce a direct light oriented, for example, towards a work surface. This second light source may be moved between a first and a second switching state, in particular switched on and off. The control unit is so designed that the above-mentioned brightness level is altered by changing the switching state of the second light source. In such a method, the second light source may only be switched on and off. There is no brightness control of this second light source.

Furthermore, combined lamps are known, especially workstation or freestanding lamps that provide direct lighting of a specific object such as a workstation through a first lighting means, and indirect lighting, for example of a ceiling, through a second lighting means. Such lamps may be adjusted by a sensor depending on the brightness of the light. Such lamps are used in a sensor system for presence detection, so if someone approaches the lamp, these lamps may switch on automatically.

The problem with such lamps that are switched on through presence detection is that they may be unintentionally and immediately switched off in adverse lighting situations. Such an unfavorable lighting situation may, for example, occur if the incident amount of light is minimal at the light sensor and undershoots the switch-on value, while the indirect illumination provides too high a feedback value to the light sensor. In this situation, the switch-off value is then undershot and the lamp is switched off. This phenomenon is known as a yo-yo effect, and should be avoided in lamps.

Another problematic lighting situation arises when the light component from the second light emitting means reaching the sensor is very high because of the conditions in the room in which the lamp is located. This problem of the unwanted influence of the various light components remains unresolved.

This is where the present invention is applied.

The present invention aims to provide a method for operating a lamp of the kind mentioned, i.e. a lamp having a separately controllable first light emitting means to provide a direct light source, along with further light emitting means to provide an indirect light component, whereby the above-mentioned disadvantages may be avoided by means of the invented control system.

The object of the present invention is to resolve the problems mentioned above.

BRIEF SUMMARY OF THE INVENTION

In a preferred embodiment, a method for operating a lamp comprising a first light emitting means for direct lighting and a second light emitting means for indirect lighting of an object, as well as a controller in order to control the first light emitting means and the second light emitting means separately, and whereby the lamp has at least one light sensor mounted on the lamp to detect the total amount of light in the range of the light sensor including any extraneous light present there, whereby the light sensor is connected to the control device, characterized in that a controller having means to subtract from the total amount of light detected by the light sensor a calculated amount of light produced by the second light emitting means and the indirect light amount that is incident to the light sensor, and thus only as a function of the signals reaching the light sensor, and from the amount of direct light produced by the first emitting means as well as any extraneous light incident to the light sensor in order to control the lamp, in particular to switch it on or off.

In another preferred embodiment, the method as described, wherein the controller has a control device that produces an output signal representing the total amount of light detected by the light sensor minus the calculated indirect light amount in order to control the brightness of the first light emitting means.

In another preferred embodiment, the method as described, further comprising wherein a predetermined positive or negative value is subtracted from the first output signal, in order to control the brightness of the second light source via a second output signal derived therefrom.

In another preferred embodiment, the method as described, wherein the second output signal is multiplied by a factor and the product corresponds to the calculated amount of light that is subtracted from the second light emitting means and is detected at the light sensor.

In another preferred embodiment, the method as described, wherein the factor is a room reflection factor representing a measurement determined by calculation of an indirect light amount output from the second light emitting means and reaching the light sensor.

In another preferred embodiment, the method as described, wherein, in an initial calibration mode of the lamp, only the second light emitting means is switched on and off, and the room reflection factor is determined from the difference between the amounts of light thus determined by the light sensor, as well as the knowledge of the level of a second output control value.

In another preferred embodiment, the method as described, wherein there is a plurality of on and off switching cycles of the second light emitting means enabling a mean of the room reflection factors to be calculated.

In another preferred embodiment, the method as described, wherein the room reflection factor is tracked, whereby the first light emitting means and then the second light emitting means are each switched on at different times enabling the previously detected room reflection factor to be corrected according to the difference between them as determined from the amounts of light reaching the light sensor.

In another preferred embodiment, the method as described, further comprising wherein a time-delayed switching on of the first light emitting means and the second light emitting means within a matter of seconds.

In another preferred embodiment, the method as described, wherein the adjustment of the room reflection factor is carried out dynamically.

In another preferred embodiment, the method as described, wherein the second light emitting means for the indirect light is always switched off with the first light emitting means for the direct light.

In another preferred embodiment, the method as described, wherein the second light emitting means for the indirect light is illuminated by at least at a minimum value on switching on of the first light emitting means, with the exception of a period required for the delayed switching on of the second light emitting means.

In another preferred embodiment, the method as described, further comprising wherein the lamp has a sensor to detect presence and in the event of the detection of the presence of a moving person, it switches on the lamp, insofar as this is required due the lighting conditions.

In another preferred embodiment, the method as described, wherein the first light emitting means and the second light emitting means are switched off when an internal control value for the direct light component within the control device undershoots a switch-off threshold.

In another preferred embodiment, the method as described, wherein the controller is used to control the workstation and/or free-standing lamps and thus the room lighting.

In another preferred embodiment, the method as described, wherein the first light emitting means and/or the second light emitting means is formed in each case by one or more light-emitting bodies, in particular by one or more LEDs.

DETAILED DESCRIPTION OF THE INVENTION

Figure 1:
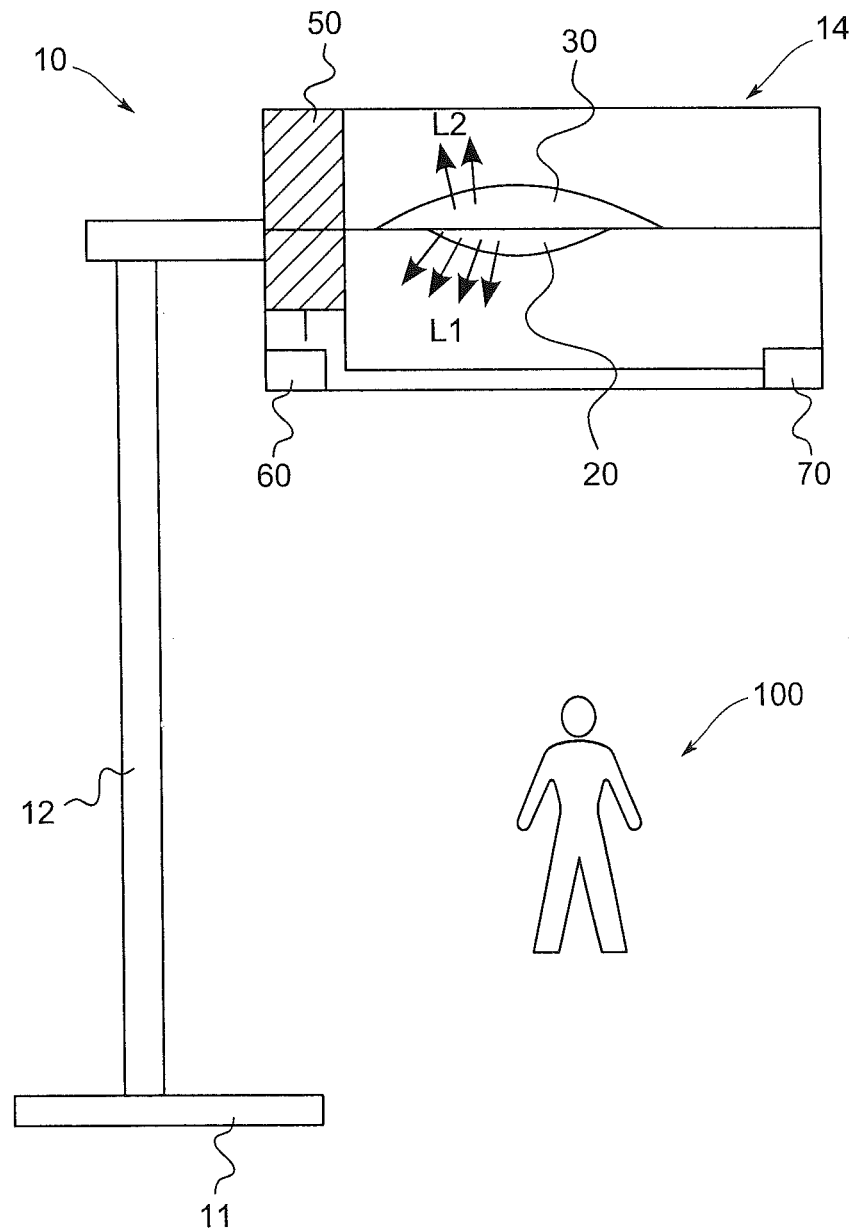
FIG. 1 is a line drawing evidencing the basic structure of a lamp, as used in the method according to the invention.

The method involves a controller having means to subtract from the total amount of light detected by the light sensor, a calculated amount of light produced by the second light emitting means and the indirect amount of light reaching the light sensor, and thus only as a function of the amount of direct light reaching the light sensor, and from the amount of direct light produced by the first light emitting means as well as any extraneous light reaching the light sensor, in order to control the lamp, in particular by switching it on or off.

By this measure and using a single light sensor located on the lamp, it is possible to determine mathematically the amount of indirect light produced by the second light emitting means and incident to the lamp, and which is attenuated on reaching the light sensor, and to take this into account in the regulation or adjustment of the brightness of the first emitting means.

In a further development of the invention, the controller has for this purpose an adjustment device that deducts or subtracts the calculated indirect light amount from the total amount of light detected by the light sensor, and provides an output signal or control signal to adjust the brightness of the first light emitting means. Advantageously, the control signal is supplied to a suitable transducer device, which is connected between the output of the controller and the first light emitting means.

In a further embodiment of the invention, a predetermined positive or negative value may be deducted from the first control signal in order to directly control a second output signal obtained from the brightness of the second light emitting means. In this way, a positive or negative off-set may be provided to adjust the brightness of the second light emitting means as a function of the brightness of the first light emitting means. If the predetermined value is, for example 0.5, this means that the second light emitting means is always half as strong as the first light emitting means. Of course, other values are also conceivable for this purpose.

In one embodiment of the method according to the invention, the said second output signal for controlling the second light emitting means is supplied to a suitable transducer that provides the actual control signal for the second light emitting means.

In a development of the method according to the invention, the amount of light that comes from the second light emitting means and reaches the light sensor is not determined by measurement, but is calculated within the controller. In this case, the second output signal that is provided to the transducer for the second light emitting means, is multiplied by a suitable factor. This factor is a so-called room reflection factor, and is a calculated measurement of the amount of indirect light emitted by the second light emitting means and reaching the light sensor.

This room reflection factor may be determined in an embodiment of the invention in an initial calibration mode of the lamp, whereby only the second light emitting means is switched on and off, and the room reflection factor is determined from the difference between the amounts of light thus determined by the light sensor, and preferably also the knowledge of the level of a second output control value. It is possible to determine a mean value of the room reflection factor, characterized in that a plurality of on-off cycles of the second light emitting means is determined from the individual values, while a mean value is calculated therefrom.

It is also within the scope of the invention, that the room reflection factor is updated by using the first light emitting means and then the second light emitting means may be switched on after a time delay in the subsequent operation, i.e. no longer in the calibration mode, and the difference between the amount of light thus determined by the light sensor and the knowledge of the level of the second input control value enables correction of the previously determined room reflection factor. In this case, the time delay between switching on of the first light emitting means for the direct light and switching on the second light emitting means for indirect lighting may, for example, be a matter of seconds.

It is also within the scope of the invention that the adaptation of the room reflection factor occurs dynamically during operation of the lamp, and is therefore constantly corrected.

It is also within the scope of the invention that the second light emitting means is always switched off for the indirect light instead of the first light emitting means for the direct light. The second light emitting means may also always be switched off with the first light emitting means. However, it is advisable, as mentioned above, to have a time delay in the switching on of the second light emitting means with respect to the first light emitting means, to ensure, for example, the above-mentioned dynamic tracking of the room reflection factor.

A further development of the invention provides, moreover, that the second light emitting means always provide at least at a minimum lighting value for the indirect light when the first lamp is switched on, except for the above-mentioned period of time when a delay in switching on of the second lamp is possible.

It is advisable that the lamp has a sensor for presence detection. The detection of a moving person in the sensitivity range of the sensor can switch on the lamp, insofar as the lighting conditions require it. The lamp may be switched off automatically by means of an appropriate timer switch located in the controller when the presence detection sensor detects that there is no one in the sensitivity range of the sensor.

It is advantageous in the method according to the invention that the first light emitting means and the second light emitting means are switched off when an internal control value supplied from the controller for the direct light component of the first light emitting means undershoots a switch-off threshold in the controller.

The method according to the invention is particularly suitable for the operation of workstation and/or free-standing lamps. The method according to the invention is therefore optimally suited for room lighting.

According to the invention, it may be arranged that the first light emitting means and/or the second light emitting means are formed respectively of one or more light-emitting bodies, in particular by one or more LEDs.

DETAILED DESCRIPTION OF THE FIGURES

FIG. 1 shows a lamp 10 that is designed as a free-standing lamp in this case. However, this lamp 10 may also be a table lamp or a work lamp and, as in this example, may be mounted on a wall or a ceiling by suitable fixing means.

The free-standing lamp illustrated in FIG. 1 as an example has a base 11 from which a support rod 12 extends vertically upwards. At the upper end of the support rod 12, a lamp head 14 is supported in a housing in which are disposed a first light emitting means 20 and a second light emitting means 30. The first light emitting means 20 may be any type of light emitting means, especially an LED light emitting means that is designed to directly illuminate an object 100, which may be a person or a workstation or the like. In this case, the first light-emitting means 20 emits an amount of light $L_1$. Within the housing of the lamp head 14 is located a second light emitting means 30 that may also comprise one or more LEDs. In contrast to the first light emitting means 20, this second light emitting means 30 is arranged inside the lamp head 14 so that this emits light directed away from the object 100. The amount of light emitted from said second light emitting means 30 is designated by the reference $L_2$.

Furthermore the lamp 10 has a controller 50 which is arranged within the lamp head 14 in the illustrated embodiment. This controller 50 serves to switch on and off the first light emitting means 20 and the second light emitting means 30, and also to adjust their respective brightness. In this case, the controller 50 is connected with the first light emitting means (20) and the second light emitting means (30) by means of leads that are not shown in FIG. 1.

Finally, the lamp 10 has a light sensor 60 as well as another sensor 70 for detecting presence of an object, in particular a person, entering the sensitivity range of the sensor 70. The sensors 60 and 70 are connected to the controller for this purpose. Of course, the lamp 10 has a suitable power supply means but that are omitted in FIG. 1 for greater clarity.

Figure 2:
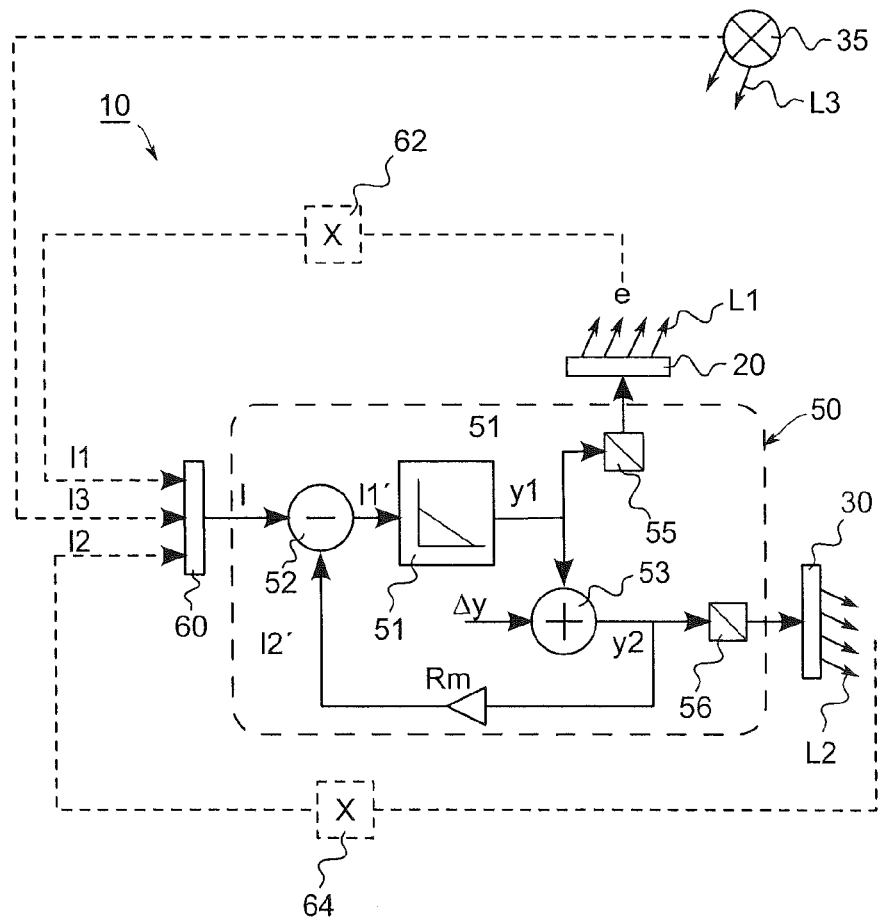
FIG. 2 is a block diagram of the lamp illustrated in FIG. 1.

FIG. 2 shows a block diagram of the individual parts that are present in the lamp 10 shown in FIG. 1, and particularly in the controller 50. The reference numbers mentioned above continue to apply for the same parts.

The lamp 10 has the controller 50 to which the light sensor 60 is connected on the input side. On the output side, the controller 50 is connected on the one hand to the first light emitting means 20 and on the other to the second light emitting means 30.

Assuming first of all that the first light emitting means 20 is turned on and emits an amount of light $L_1$ then a component of this amount of light $L_1$ reaches the light sensor 60 as a reduced amount of light $l_1$. The feedback of the amount of light $L_1$ to the light sensor 60 is indicated by the feedback path 62. Losses occur on this feedback path 62 that are caused, for example, through the medium of the ambient air in which the lamp 10 is located. In a smoky or steamy ambient conditions or in the case of poor reflection characteristics, the attenuation of the light $L_1$ emitted by the first light emitting means 20 is substantially higher than in the case of clear air ambient conditions.

There is a similar feedback path 64 from the second light emitting means 30 to the light sensor 60. The second light-emitting means 30 emits an amount of light $L_2$ that reaches the sensor 60 as the attenuated amount of light $l_2$. The attenuation factor may be substantial, because the second light emitting means 30 is intended to emit only indirect light.

Finally, an amount of light $l_3$ that comes from an extraneous light emitting means 35 that emits an amount of light $L_3$ may also reach the light sensor 60. Such an extraneous light emitting means may be either a lamp or other extraneous light that reaches the light sensor 60, for example from a door or window.

Therefore, a total amount of light l is detected by the light sensor 60 that corresponds to the sum of the light components $l_1+l_2+l_3$.

This overall light amount I at the light sensor 60 is supplied to the controller 50.

The controller 50 has a control device 51 that is connected to an output of a subtractor 52. A signal that is representative of the total amount of light l is supplied to a first input of the subtractor 52. A signal $l_2'$, which is described below, is supplied to a second input of the subtractor 52, whereby the said signal corresponds to a calculated value for that amount of light $l_2$ that is present at the light sensor 60 and is caused by the second light-emitting means 30. This second signal $l_2'$ is subtracted from the total amount of light l in the subtractor 52.

Accordingly, a signal $l_1'$ is supplied to the input of the control device 51, whereby the said signal consists of the total amount of light I minus the calculated value $l_2'$. The control device 51 determines a corrective signal $y_1$ at its output from the input signal $l_1'$, whereby the corrective signal is used as a correcting variable for the brightness of the first light emitting means 20 via a transducer 55.

The output signal $y_1$ is further supplied to an adder 53, specifically to a first input. A signal $\Delta y$ is supplied to a second input of this adder 53 in order to produce the sum of both signals in the form of a correcting variable $y_2$, which is provided to control the brightness of the second light source 30 via a second transducer 56. The control signal $\Delta y$ may be set as required. For example, the control signal $\Delta y$ may have a value of $-0.5$ in order to ensure that the second light emitting means 30 always illuminates at half the brightness compared to the brightness of the first light emitting means 20.

As FIG. 2 also shows, the control signal $y_2$ is multiplied by a factor $R_m$ to yield a value of $l_2'$. The value of $R_m$ is a so-called room reflection factor and thus a measure of how much of the amount of light $l_2$ of the amount of light $L_2$ reaches the light sensor 60 from the second light emitting means 30.

This room reflection factor $R_m$ may be varied by the controller 50.

In a calibration mode of the lamp 10, this factor $R_m$ is determined on installation of the lamp 10 in a room, where preferably first of all the second light-emitting means 30 are switched on and off several times by the control device 50. The first light emitting means $L_1$ remain switched off.

The control means determines a factor that represents the difference between the switching on and off and the knowledge of a second output correcting variable $y_2$ that is provided first of all, whereby the factor is a measure of how much of the amount of light of the second light-emitting means 30 reaches the light sensor 60. This factor $R_m$ is calculated, for example, according to the following formula:

$$R_m = \frac{l_t - l_{t-1}}{y_t}$$

where,
$I_t$ amount of light detected by the sensor at time t
$I_{t1}$ amount of light detected by the sensor at time t−1
$y_t$ correcting variable at time t.

Once this room reflectance factor $R_m$ has been determined, it is multiplied by the value $y_2$ by the controller 50 during operation of the lamp, and then—with the first light emitting means 20 switched on—the above-mentioned value of $l_2'$ is calculated.

This value $R_m$ may always be adjusted by the controller 50 during operation of the lamp 10, by means of a time delay in switching on the lamp 10, i.e. on switching on the first light emitting means 20, the switching on of the second light emitting means 30 is delayed, for example, by a few seconds. In this way, the component of the light coming from the second light emitting means 30 and reaching the light sensor 60 may be determined.

Figure 3:
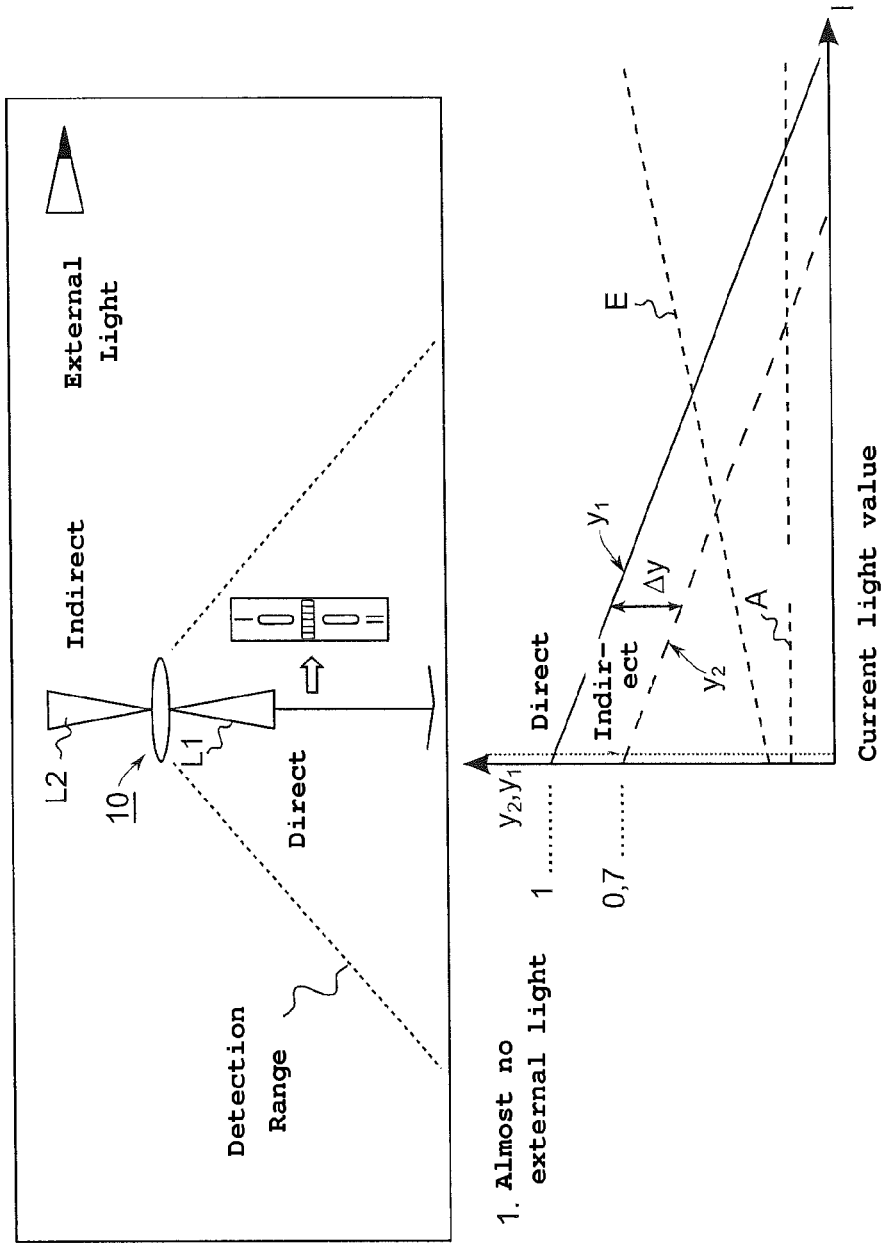
FIG. 3 is a line drawing evidencing an embodiment of a lighting situation with a lamp that is switched off and the relevant characteristics of the arrangement shown in FIG. 2.

FIG. 3 shows the typical characteristic curve of a lamp, as it is stored, for example, in the control device 51. The characteristic curves for the correcting variables $y_1$ and $y_2$ are, for example, represented as linear characteristic curves on a logarithmic scale as a function of the total light value l received by the sensor 60. This is confirmed in the embodiment shown in FIG. 3 where the characteristic curve of the second light emitting means is always less bright by a factor of 0.3 than the first light emitting means 20. $\Delta y$ is therefore 0.3. It is assumed that in the case of light with a value l=0 received by the sensor, the first light emitting means 20 illuminates with a maximum amount of light, and a control signal $y_1=1$ is provided to this end. Accordingly, the second light emitting means 30 is controlled by a control signal $y_2=0.7$ during operation of the lamp 10.

As can also be seen in FIG. 3, a switch-on threshold E and a switch-off threshold A is set within the control device in order to switch off the lamp 10 when it is determined by the control device 50 that the control signal $y_1$ undershoots the switch-off threshold A, while the lamp 10 is switched on when this control signal $y_1$ overshoots the switch-on threshold E.

In the exemplary embodiment of FIG. 3, it is assumed that the lamp 10 is switched off, and thus the lamp 10 does not emit either an amount of light $L_1$ or an amount of light $L_2$. Furthermore, it is assumed that almost no extraneous light falls on the light sensor of the lamp 10.

Figure 4:
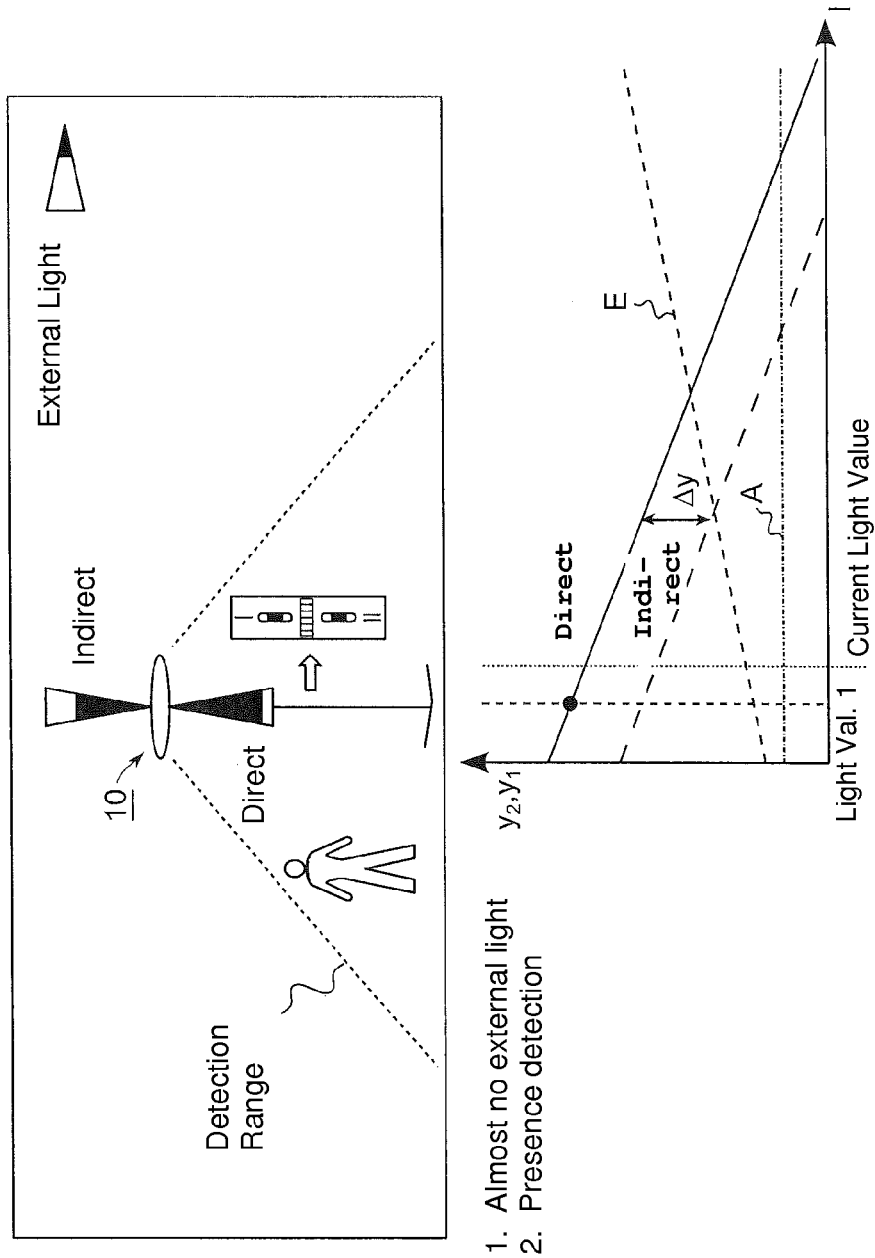
FIG. 4 is a line drawing evidencing a similar representation as in FIG. 3, but with the lamp switched on due to presence detection.

In the situation of FIG. 4, a person enters the detection range of the sensor presence of the lamp 10. In addition, it is assumed that almost no extraneous light reaches the light sensor of the lamp 10. The lamp 10 is switched on because the light value $l_1$ determined in the controller undershoots the switch-on threshold E. In this case, the light value $l_1$ is smaller than the actual light value received from the light sensor because of the controller illustrated in FIG. 2, and the related subtraction of the said calculated light component $l_2'$.

Figure 5:
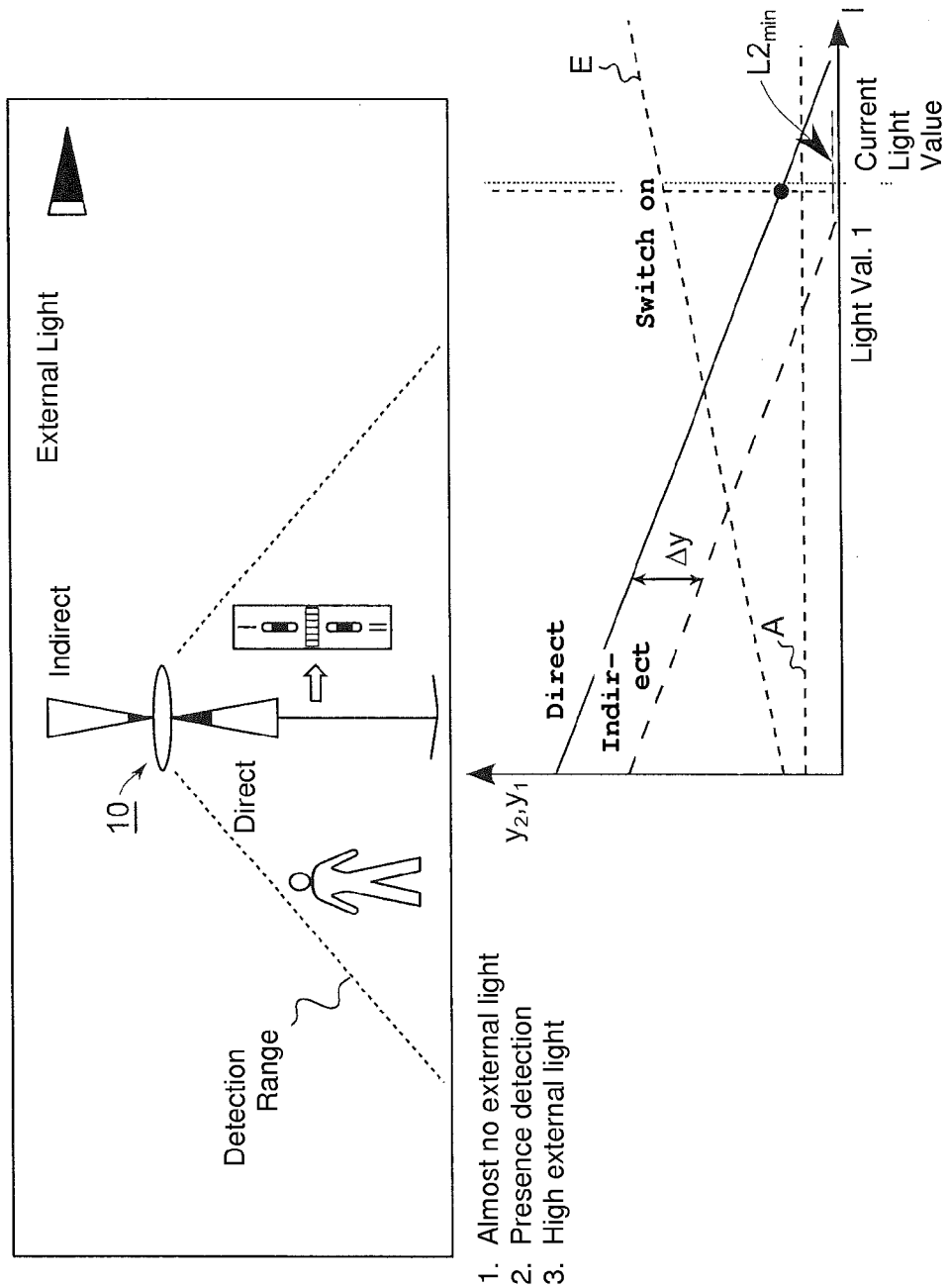
FIG. 5 is a line drawing evidencing a similar view to FIG. 4, but with a high external extraneous light component.

FIG. 5 shows the case where high extraneous light is present in the detection area of the light sensor. However, the lamp 10 remains switched on because the light value $l_1$ determined within the controller 50 still overshoots the switch-off threshold A. However in this case, as shown in FIG. 5, the second light-emitting means 30 is still only at a minimum value $L_{2Min}$ for the indirect illumination.

Figure 6:
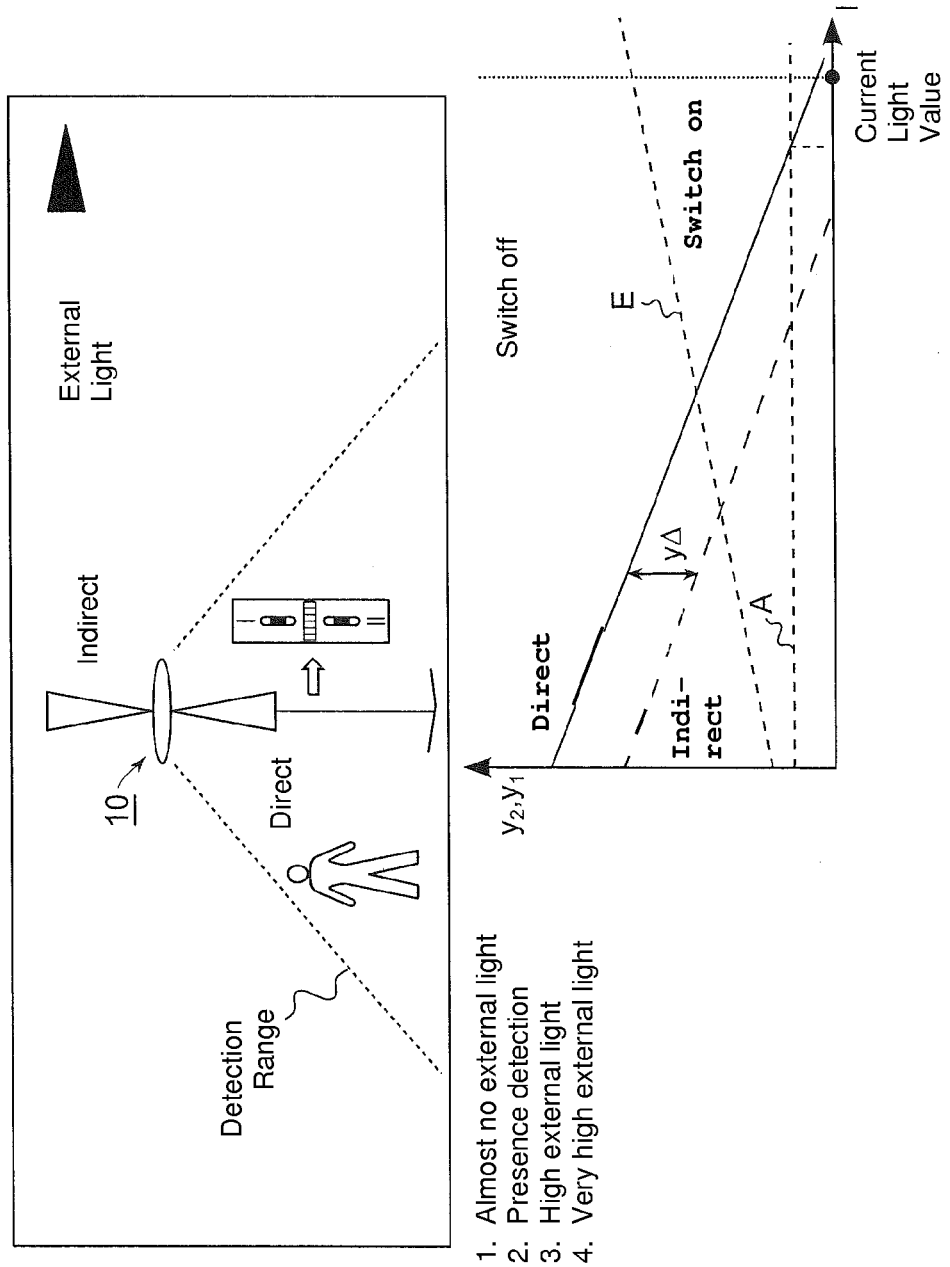
FIG. 6 is a line drawing evidencing a similar representation to FIG. 5 with a very high external extraneous light component and the lamp switched off.

In FIG. 6, the incidence of external light on the light sensor is even greater. As can be seen, the control signal $y_1$ undershoots the switch-off threshold A, so that the lamp is completely switched off.

LIST OF REFERENCE NUMBERS

10 Lamp
11 Base
12 Support rod
14 Lamp head
20 First light emitting means
30 Second light emitting means
35 Extraneous light source
50 Controller
51 Control device
52 Subtractor
53 Adder 55 Transducer
56 Transducer
60 Light sensor
62 Feedback path
64 Feedback path
70 Presence detection sensor
100 Object, person
$L_1$ Light emitted from the first light emitting means 20
$L_2$ Light emitted from the second light emitting means 30
$L_3$ Light emitted at the extraneous light source 35
$l_1$ Light received at the light sensor from the first emitting means 20
$l_2$ Light received at the light sensor from the second emitting means 30
$l_3$ Light received by the light sensor, extraneous light
$l_2'$ Amount of light incident to the light sensor 60
$l_1'$ Total amount of light incident to the light sensor 60, less the calculated amount of light $l_2'$
$l$ Total amount of light detected at the sensor, i.e. $l=l_1+l_2+l_3$
$y_1$ Control signal for adjusting the brightness of the first light emitting means 20
$y_2$ Control signal for adjusting the brightness of the second light emitting means 30
$\Delta y$ Off set between $y_1$ and $y_2$, i.e. $y_1-y_2$
$R_m$ Room reflection factor
A Switch-off threshold
E Switch-on threshold The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A method for operating a lamp comprising a first light emitting means for direct lighting and a second light emitting means for indirect lighting of an object, a controller configured to control the first light emitting means and the second light emitting means separately, and wherein the lamp has at least one light sensor mounted on the lamp to detect the total amount of light in the range of the light sensor including any extraneous light present, wherein the light sensor is connected to the controller, the controller having means to subtract from the total amount of light detected by the light sensor, a calculated amount of light produced by the second light emitting means and the indirect light amount that is incident to the light sensor, and a function of the signals reaching the light sensor, and from the amount of direct light produced by the first emitting means, combined with any extraneous light incident to the light sensor in order to control the lamp, in particular to switch it on or off.

2. The method of claim 1, wherein the controller comprises a control device that produces a first output signal representing the total amount of light detected by the light sensor minus the calculated indirect light amount in order to control the brightness of the first light emitting means.

3. The method of claim 2, further comprising wherein a predetermined positive or negative value is subtracted from the first output signal, in order to control the brightness of the second light source via a second output signal derived therefrom.

4. The method of claim 3, wherein the second output signal is multiplied by a factor and the product corresponds to the calculated amount of light that is subtracted from the second light emitting means and is detected at the light sensor.

5. The method of claim 4, wherein the factor is a room reflection factor representing a measurement determined by calculation of an indirect light amount output from the second light emitting means and reaching the light sensor.

6. The method of claim 5, wherein, in an initial calibration mode of the lamp, only the second light emitting means is switched on and off, and the room reflection factor is determined from the difference between the amounts of light determined by the light sensor, and the knowledge of the level of a second output control value.

7. The method of claim 5, wherein there is a plurality of on and off switching cycles of the second light emitting means enabling a mean of the room reflection factors to be calculated.

8. The method of claim 5, wherein the room reflection factor is tracked, whereby the first light emitting means and then the second light emitting means are each switched on at different times enabling the previously detected room reflection factor to be corrected according to the difference between them as determined from the amounts of light reaching the light sensor.

9. The method of claim 8, further comprising wherein a time-delayed switching on of the first light emitting means and the second light emitting means within a matter of seconds.

10. The method of claim 1, wherein the adjustment of the room reflection factor is carried out dynamically.

11. The method of claim 1, wherein the second light emitting means for the indirect light is always switched off with the first light emitting means for the direct light.

12. The method of claim 1, wherein the second light emitting means for the indirect light is illuminated by at least at a minimum value on switching on of the first light emitting means, with the exception of a period required for the delayed switching on of the second light emitting means.

13. The method of claim 1, further comprising wherein the lamp has a sensor to detect presence and in the event of the detection of the presence of a moving person, it switches on the lamp, insofar as this is required due the lighting conditions.

14. The method of claim 1, wherein the first light emitting means and the second light emitting means are switched off when an internal control value for the direct light component within the control device undershoots a switch-off threshold.

15. The method of claim 1, wherein the controller is used to control the workstation and/or free-standing lamps and thus the room lighting.

16. The method of claim 1, wherein the first light emitting means and/or the second light emitting means is formed in each case by one or more light-emitting bodies, in particular by one or more LEDs.

* * * * *